UNITED STATES PATENT OFFICE.

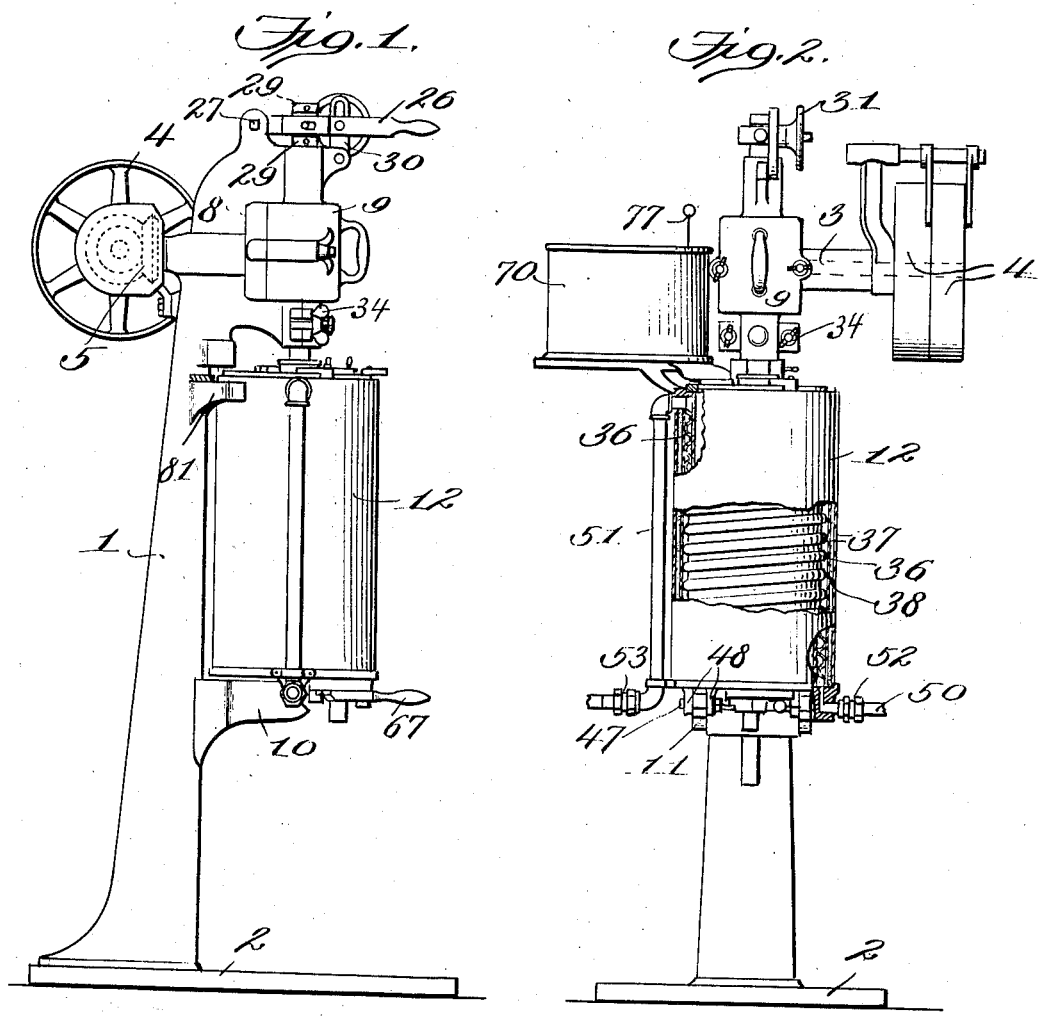

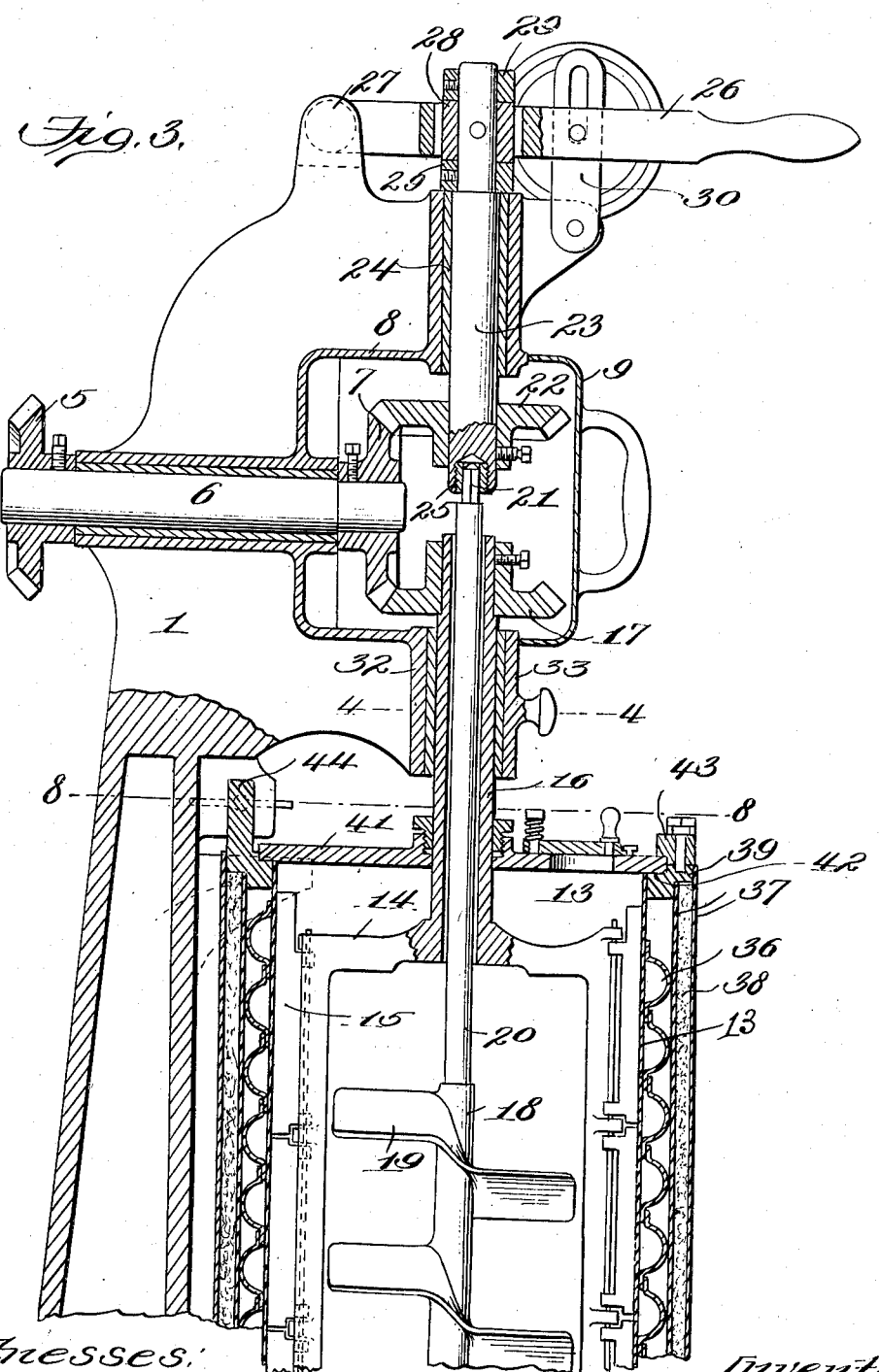

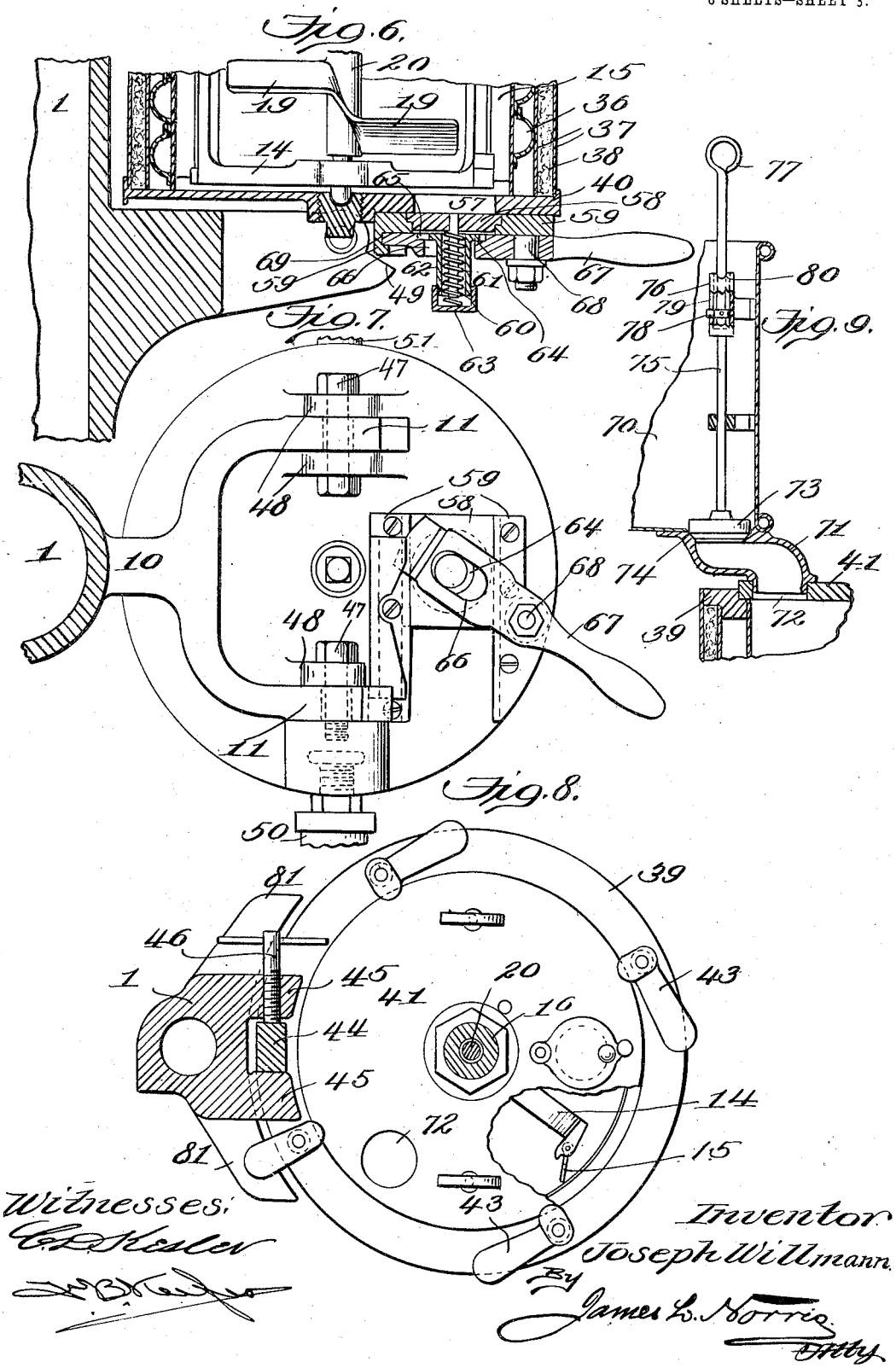

JOSEPH WILLMANN, OF DERBY, CONNECTICUT.

ICE-CREAM-MAKING MACHINE.

963,675.  Specification of Letters Patent.  Patented July 5, 1910.

Application filed January 7, 1910. Serial No. 536,810.

*To all whom it may concern:*

Be it known that I, JOSEPH WILLMANN, a subject of the Emperor of Germany, residing at Derby, in the county of New Haven and State of Connecticut, have invented new and useful Improvements in Ice-Cream-Making Machines, of which the following is a specification.

My present invention relates to improvements in ice cream freezers and more especially to the type having a relatively large capacity and wherein the operative parts of the freezer are driven by power, and it has for its object to provide an ice cream making machine of a generally improved construction, the present improvements relating more particularly to the mounting of the freezer upon its support whereby it may be tilted or moved out of its normal operative position in order to facilitate cleaning thereof. A simple but efficient device is provided for locking the freezer in operative position relatively to the driving gear, and an improved arrangement is provided whereby the thrust or strain of the driving gears is sustained by a relatively solid standard or support and is thereby relieved from the freezer.

Other objects of the invention are to provide a simple but efficient gate for controlling the discharge of the frozen cream from the freezer, to provide simple but efficient means for supplying fresh liquid to be frozen and under proper control to the freezer and, in general, to improve the construction of the machine in many respects.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a side elevation of an ice cream freezing machine constructed in accordance with the present invention; Fig. 2 is a front elevation of the machine as viewed from the right in Fig. 1, portions of the freezer casing being broken away to disclose the connections between the freezing coil and the brine supply and discharge pipes; Fig. 3 represents a central vertical section through the upper portion of the machine showing the driving gear and the upper portion of the freezer; Fig. 4 represents a transverse section on the line 4—4 of Fig. 3; Fig. 5 represents a central longitudinal section of one of the swivel connections for the brine pipe; Fig. 6 represents a central vertical section through a portion of the standard and the lower portion of the freezer disclosing particularly the discharge gate; Fig. 7 is a bottom plan view of the part shown in Fig. 6; Fig. 8 represents a section on the line 8—8, Fig. 3; and Fig. 9 is a detail sectional view of portions of the supply reservoir and the freezer showing the valve for controlling the flow of liquid into the freezer.

Similar parts are designated by the same reference characters in the several views.

In the accompanying drawing, I have shown one particular embodiment of the invention.

While the construction shown is generally preferable, it will be understood that the invention is not necessarily limited precisely to the details, as certain modifications and changes may be made therein in order that the invention may be applied to the best advantage according to the circumstances of each particular case. In the present instance, the machine comprises a standard 1 having a suitable base 2 which preferably provides a support for a receptacle to receive the frozen material, and the standard provides a support for a driving shaft 3 having suitable driving pulleys 4, and this main shaft 3 is connected through the bevel gearing 5 to the horizontal shaft 6, the latter being preferably journaled in a suitable bearing formed in the upper portion of the standard, this shaft 6 carrying a bevel gear 7 at its forward end which is closed by a gear case 8 which is formed in the upper portion of the standard and is closed at the front by a removable cover section 9, the latter being so constructed that it may be readily applied and removed when necessary. A bracket 10 projects forwardly from the standard and is divided to form a pair of forwardly directed pivot arms 11, and the freezer 12 is supported by this bracket.

In order that the freezer may be cleaned with facility, it is pivotally mounted on the bracket whereby after the driving mechanism has been disconnected from the freezer, the latter may be swung or tilted forwardly into a horizontal or nearly horizontal position and while the freezer is in operative position, this bracket serves to support it.

In the present instance, the freezer embodies an inner cylindrical can 13 to contain the cream or material to be frozen. In order to insure a rapid and uniform freezing of the cream, a scraper and a dasher are mounted to revolve in reverse directions within the can, the scraper in the present instance comprising a hollow frame 14 having scraping blades 15 pivotally mounted thereon so as to constantly and thoroughly remove the material from the inner side of the can surface, this scraper frame having a sleeve 16 provided with a bevel gear 17 which coöperates with the bevel gear 7.

The dasher 18 is provided with the usual inclined blades 19, the dasher revolving within the hollow scraper frame and is carried by a vertical shaft 20 which extends through the sleeve 16 of the scraper and is provided at its upper end with a square or angular head 21. The dasher is revolved in a reverse direction with respect to the direction of revolution of the scraper through an upper bevel gear 22 mounted on a shaft 23, the latter being journaled in a bearing 24 formed in the top of the standard and has a hard metal bushing 25 threaded or otherwise inserted in its lower end, this bushing having a socket or opening corresponding in shape to the square or angular head 21 on the dasher shaft so that when the shaft 23 is lowered, it will be coupled to the dasher through the bushing and angular head. The shaft 23 is so mounted in the bearing 24 as to permit of sufficient longitudinal movement to couple and uncouple it with respect to the dasher, and any suitable means may be provided for shifting the shaft. In the present instance, a common form of device for effecting this purpose is provided embodying a lever 26 which is pivoted to the frame at 27 and is operatively connected to a sleeve 28 loosely mounted upon the shaft 23 between the limiting collars 29, a link 30 being pivoted to a suitable part of the standard and coöperating with the lever 26 in conjunction with a clamp 31 whereby the lever and consequently the shaft 23 may be secured either in elevated or lowered position.

In order that any driving strain between the driving shaft and the freezer may be sustained by the standard, a bearing is provided on the standard to coöperate with the dasher sleeve 16 at a point beneath the gearing, this bearing in the present instance being formed of two sections, the section 32 being preferably integral or permanently fixed to the standard, while the complemental segmental section 33 is formed separately and is detachable with respect to the standard, a pair of clamping bolts 34 being provided for securing the detachable bearing section in operative position. These clamping bolts are preferably pivoted to the standard as at 35 in order to facilitate the manipulation thereof and to prevent displacement or loss. This detachable bearing section 33 is removed and the cover 9 is detached after the shaft 23 has been uncoupled from the dasher shaft when it is desirable to swing the freezer into a horizontal position to facilitate cleaning.

The freezer can is surrounded by a freezing coil adapted for the circulation of a brine or freezing mixture. In the present instance, the coil is composed of a length of tubing 36 which is segmental or semi-circular in cross-section and is coiled helically about the exterior of the can, the longitudinal edges of the tubing being bent laterally and sweated, soldered or otherwise permanently united by a fluid-tight joint with the can. Any suitable provision may be made to insulate the can and its freezing coil from the atmosphere, a pair of inner and outer shells 37 being provided between which may be packed asbestos or other heat insulating material 38, and the can with its insulating jacket is united in the well known manner by the use of a flange 39 at the top and a base plate 40 at the bottom, the base plate 40 closing the bottom of the can while a cover plate 41 may be provided to close the top of the can. This cover plate 41 may be seated in an annular depression 42 formed in the flange 39 and it may be detachably secured in position by means of a suitable number of pivoted catches 43 which are carried by the flange 39 and have portions which are adapted to project over the cover plate.

In order to firmly support the can in operative position and thereby relieve the driving mechanism of any strain, the flange 39 is provided with an upwardly projecting lug 44 which is arranged to pass into a space formed between a pair of opposed projections 45 preferably formed integrally with the standard, and a clamping screw 46 is tapped into one of these projections and when tightened coöperates with the lug 44 to rigidly lock it in position.

The base plate 40 of the freezer is pivotally mounted upon the arms 11 of the supporting bracket by means of bolts 47 which pass through the arms 11 and pairs of depending hinge lugs 48 which may be formed as integral parts of the base plate, the forward edges of the arms 11 in the present instance being provided with shoulders 49 which constitute stops to coöperate with the under side of the base plate and thereby limit the forward tilting movement thereof, the freezer being thereby supported firmly during cleaning.

The brine or freezing mixture is conducted to and from the coil 36 by pipes 50 and 51 and in order to render it unnecessary to disconnect the brine pipes during the tilting of the freezer, ordinary swivel connections 52 and 53 may be provided for these pipes. In Fig. 5, I have shown a detail view of the swivel 53 which is connected to the outlet pipe, the elbow 54 being connected to the section 55 preferably by a ground tapered joint which joint is kept tight by means of a nut 56.

The frozen material is discharged from the freezer through an outlet 57 formed in the base plate 40, and this outlet is controlled by a gate which in the present instance comprises a slide 58 which is guided to reciprocate between a pair of guides 59 so as to cover and uncover the outlet. In order to insure a proper seating of the sliding gate, the latter is provided with a stem 60 which is surrounded by a helical compression spring 61, this spring acting at one end against the under side of the sliding gate 58 and thereby tending to press the same closely against the under side of the base plate while the spring is inclosed by a sleeve 62 which has an adjustable cap 63 threaded upon its lower end and receives the pressure of the lower end of the spring. This inclosing sleeve 62 is provided with a flange 64 which rests in a recess 65 while the body portion of the sleeve 62 extends through a slot 66 formed in an operating lever 67, the latter being pivoted to a part fixed to the base plate through the medium of a pivot bolt 68 while its opposite or free end is guided in a groove 69 formed in one of the guides 59.

In order to facilitate the introduction of the liquid to be frozen into the freezer, a reservoir or tank 70 may be suitably supported above the freezer, this tank in the present instance having a spout 71 which leads to an inlet 72 formed in the cover plate 41. In order to control the flow of the liquid into the freezer, a valve 73 is provided which has a seat 74 leading to the spout 71, and the stem 75 of the valve extends through a guide 76 and is prolonged to form a handle 77. In order to retain the valve in open position during the flow of the contents of the tank into the freezer, the valve stem is provided with a pin or projection 78 which operates in a vertical slot 79 formed in the guide 76 and when the valve has been fully opened, a partial rotation of the valve stem will bring the pin or projection 78 into a position to enter the notch or depression 80 formed in the top of the guide 76, a releasing of the pin or projection from the notch enabling the valve to move into closed position by gravity.

In order to center the upper portion of the can with respect to the standard and the driving gear carried thereby, a pair of curved arms 81 may be provided which in the present instance proceed from the opposite sides of the standard and are curved to conform substantially to the curvature of the outer jacket of the freezer.

Ordinarily, the parts of the machine occupy the relative positions shown in Figs. 1, 2 and 3, motion being imparted from the shaft 6 and its gear 7 to the reversely arranged bevel gears 17 and 22 causing the scraper and dasher to revolve simultaneously in reverse directions, the frozen cream being discharged from time to time by an opening of the gate at the bottom. When, however, it becomes necessary or desirable to clean the can, the lever at the top of the machine is lifted, thereby uncoupling the shaft 23 from the dasher shaft, and after removal of the gear cover 9 and the detachable bearing section 33, the freezer can be swung forwardly about the pivots 47 as an axis until arrested by the stops 49, the freezer being thereby supported in a position convenient for cleaning.

I claim as my invention:

1. In an ice cream making machine, the combination of a standard carrying a driving gear, a freezer tiltably mounted at its lower end upon the standard and operatively connected at its upper end to said driving gear, and a locking device connecting the upper portion of the standard and the top of the freezer adjacent to its point of connection with the driving gear for permanently supporting the freezer in upright operative position.

2. In an ice cream making machine, the combination of a standard provided with a driving gear at its upper portion, a freezer pivotally connected at the bottom to the standard and capable of occupying two different positions by a tilting motion, the operative parts of the freezer being connected at the upper end of the freezer to the driving gear of the standard, and a lock between the freezer and standard for rigidly supporting the freezer in operative position comprising a lug on one of the parts, a pair of spaced projections on the other part adapted to receive said lug between them during a portion of the tilting movement of the freezer, and a device for retaining said lug in locking position between said projections.

3. In an ice cream making machine, the combination of a standard provided with driving gear, a freezer pivotally mounted on the standard and having its operative parts detachably connected to the driving gear on the standard, and means for locking the freezer in operative relation to the standard comprising a pair of spaced projections on the standard, a lug secured to the freezer and movable into a position between said projections as the freezer moves into operative position, and a clamping screw tapped into one of said projections and coöperative with said lug to firmly clamp the latter in locking position.

4. In an ice cream making machine, the combination of a standard, driving gear mounted thereon, a freezer tiltably supported on the standard and having its operative parts detachably associated with the driving gear on the standard, a pair of reversely directed curved arms formed on the standard and coöperative with the freezer to position the freezer in correct operative relation with its driving gear, and a locking device for rigidly connecting the top of the freezer to the standard.

5. In an ice cream making machine, the combination of a standard having a bracket projecting forwardly therefrom, a freezer pivotally connected to said bracket whereby the freezer may be tilted from a vertical to a substantially horizontal position, and stops formed upon the bracket adjacent to the pivotal connection between the latter and the freezer and coöperative with the bottom of the freezer to support the latter in tilted position.

6. In an ice cream making machine, the combination of a standard provided at its upper portion with a driving gear, a freezer tiltably mounted on the standard and containing a revoluble agitating device, a driving shaft for the agitating device carried by the freezer and detachably connected to the driving gear on the standard, and a split bearing rigidly supported by the standard and arranged to receive and coöperate with said driving shaft for the agitating device of the freezer when the freezer is brought into upright position, said bearing when closed sustaining the thrust between the driving gear of the standard and the driving shaft carried by the freezer, and when opened, permitting said driving shaft to be disengaged laterally therefrom and allowing the freezer to be tilted from an operative position to a cleaning position.

7. In an ice cream making machine, the combination of a standard provided with driving gear, a freezer tiltably supported at its lower end on the standard and provided with a revolving scraper having an operating sleeve and gear, the latter being arranged to coöperate with the driving gear on the standard, means rigidly connecting the upper portion of the freezer to said standard, and a bearing rigidly fixed to the standard and coöperative with the sleeve for the scraper, said bearing having a detachable section adapted to be removed to permit tilting of the freezer from an operative to a cleaning position.

8. In an ice cream making machine, the combination of a standard, driving gear thereon involving a vertically movable and revoluble dasher operating shaft, a freezer tiltably supported on the standard, a dasher revoluble in the freezer and having a shaft provided with an angular operating head, and a hard metal bushing threaded axially into the lower end of the vertically movable dasher operating shaft and having an angular socket to receive the head of the dasher shaft.

9. In an ice cream freezer, the combination of a can to contain the material to be frozen, a bottom plate for the can provided with a discharge opening, a reciprocatory gate slidably mounted at the under side of the bottom plate for controlling the discharge opening, and a spring yieldably acting on the gate to retain it in coöperative relation with the under side of said bottom plate.

10. In an ice cream freezer, the combination of a can, a bottom plate therefor provided with a discharge opening, a reciprocatory gate slidably engaging the under side of said bottom plate, a lever pivotally connected to the bottom plate and operatively connected to the gate to reciprocate the latter, and a spring interposed between said lever and gate for yieldably retaining the latter in coöperative relation with the bottom plate.

11. In an ice cream freezer, the combination of a can, a bottom plate provided with a discharge opening, a gate slidably engaging the under side of said bottom plate for controlling said discharge opening, a lever pivotally mounted with respect to the bottom plate and operatively connected to the gate to reciprocate the latter, a spring interposed between said lever and gate for yieldably pressing the latter against the under side of said bottom plate, and means coöperate with a free end of said lever for holding the latter in operative position.

12. In an ice cream freezer, the combination of a can, a bottom plate provided with a discharge opening, a slidable gate coöperative with the under side of said bottom plate and carrying a pin, a lever pivotally related to the bottom plate and having a slot, a compression spring encircling the pin on the gate, and a sleeve incasing the spring and operatively connected at one end to the lever and provided with an adjusting cap at its opposite end coöperative with the spring.

13. In an ice cream freezer, the combination of a can, a bottom plate provided with a discharge opening, parallel guides secured to the under side of said bottom plate, a sliding gate coöperative with said guides for controlling the discharge opening, a lever pivoted at an intermediate point to the bottom plate and operatively connected to the sliding gate and having one of its ends engaging a groove formed in one of the guides.

14. In an ice cream making machine, the combination of a standard provided at its upper portion with a driving gear, a freezer tiltably supported at its lower end on the standard and containing a revoluble scraper provided with an operating shaft and gear which are tiltable with the freezer, said gear being arranged to coöperate with the driving gear on the standard when the freezer is arranged in upright position, means rigidly connecting the upper portion of the freezer to the standard, and a split bearing formed on the upper portion of the standard and adapted to coöperate directly with said operating shaft to maintain the gear thereon in proper mesh with the driving gear on the standard, and serving when opened to release said operating shaft and permit the same together with the freezer to be tilted into a cleaning position.

In testimony whereof I have hereunto set my hand in presence of two subscribing witnesses.

JOSEPH WILLMANN.

Witnesses:
CAROLINE L. WHEELDEN,
W. A. SIMON.